(12) United States Patent
Ashlock et al.

(10) Patent No.: US 12,072,942 B2
(45) Date of Patent: *Aug. 27, 2024

(54) DOCUMENT PACKAGE MERGE IN DOCUMENT MANAGEMENT SYSTEM

(71) Applicant: DocuSign, Inc., San Francisco, CA (US)

(72) Inventors: Andrew James Ashlock, San Francisco, CA (US); Marguerite Bouscaren, San Francisco, CA (US); Jacob Scott Mitchell, Richmond, VA (US); Duane Robert Wald, Kent, WA (US); Christopher Shane Durham, Seattle, WA (US); Saul Adams Aguilar, Redwood City, CA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,846

(22) Filed: Feb. 6, 2023

(65) Prior Publication Data

US 2023/0185861 A1    Jun. 15, 2023

Related U.S. Application Data

(63) Continuation of application No. 17/322,567, filed on May 17, 2021, now Pat. No. 11,604,839.

(51) Int. Cl.
*G06F 16/00* (2019.01)
*G06F 16/16* (2019.01)
(Continued)

(52) U.S. Cl.
CPC ............ *G06F 16/93* (2019.01); *G06F 16/162* (2019.01); *H04L 51/08* (2013.01)

(58) Field of Classification Search
None
See application file for complete search history.

(56) References Cited

U.S. PATENT DOCUMENTS

| 5,041,874 A | 8/1991 | Nishimori et al. |
| 6,366,933 B1 * | 4/2002 | Ball ..................... G06F 16/957 |
| | | 707/E17.119 |

(Continued)

OTHER PUBLICATIONS

International Search Report and Written Opinion of International Application No. PCT/US2022/029382 dated Sep. 21, 2022, 8 pp.

(Continued)

*Primary Examiner* — Hasanul Mobin
(74) *Attorney, Agent, or Firm* — Shumaker & Sieffert, P.A.

(57) ABSTRACT

A centralized document system receives a request to merge a first document package associated with a first party and a second document package associated with a second party. The first document package includes a first set of documents and the second document package includes a second set of documents. In response to the request, the centralized document system identifies a first subset of documents included in both the first and second sets of documents and identifies a second subset of documents with conflicts between the first and second sets of documents. The centralized document system rectifies the second subset of documents to cure the conflicts between the first and second sets of documents. The centralized document system generates a merged document package including the first subset of documents and the rectified second subset of documents for execution by the first and second parties.

20 Claims, 15 Drawing Sheets

(51) Int. Cl.
*G06F 16/93* (2019.01)
*H04L 51/08* (2022.01)

(56) References Cited

U.S. PATENT DOCUMENTS

| | | | |
|---|---|---|---|
| 8,438,163 | B1 | 5/2013 | Li et al. |
| 8,661,342 | B2 * | 2/2014 | Lu .................. G06Q 10/10 715/236 |
| 11,481,683 | B1 * | 10/2022 | Singh .................. G06N 5/04 |
| 11,604,839 | B2 | 3/2023 | Ashlock et al. |
| 2004/0177343 | A1 | 9/2004 | McVoy et al. |
| 2005/0160070 | A1 | 7/2005 | Mashni et al. |
| 2006/0075323 | A1 | 4/2006 | Singh et al. |
| 2006/0294002 | A1 * | 12/2006 | Brett .................. G06Q 10/10 707/E17.118 |
| 2007/0177824 | A1 | 8/2007 | Cattrone et al. |
| 2007/0198533 | A1 * | 8/2007 | Foygel .................. G06Q 10/10 |
| 2009/0271696 | A1 | 10/2009 | Bailor et al. |
| 2009/0292786 | A1 | 11/2009 | McCabe et al. |
| 2011/0015956 | A1 | 1/2011 | Curd et al. |
| 2011/0288947 | A1 | 11/2011 | Biran |
| 2014/0067631 | A1 * | 3/2014 | Dhuse .................. G06Q 40/10 705/30 |
| 2014/0164255 | A1 | 6/2014 | Daly et al. |
| 2015/0199319 | A1 | 7/2015 | Newman et al. |
| 2015/0205846 | A1 | 7/2015 | Aldridge et al. |
| 2015/0295922 | A1 * | 10/2015 | Dunn .................. G06F 21/32 713/176 |
| 2017/0024551 | A1 | 1/2017 | Phadke et al. |
| 2017/0223093 | A1 | 8/2017 | Peterson et al. |
| 2017/0235820 | A1 * | 8/2017 | Conrad .................. G06F 40/194 707/728 |
| 2018/0365201 | A1 | 12/2018 | Hunn et al. |
| 2019/0386833 | A1 | 12/2019 | Alger et al. |
| 2020/0125796 | A1 | 4/2020 | Pirhonen |
| 2020/0233999 | A1 * | 7/2020 | Welinder .................. G06F 16/93 |
| 2021/0141579 | A1 * | 5/2021 | Yuan .................. G06F 3/121 |
| 2021/0349885 | A1 * | 11/2021 | Wald .................. G06F 21/64 |

OTHER PUBLICATIONS

Notice of Allowance from U.S. Appl. No. 17/322,567 dated Nov. 9, 2022, 19 pp.

* cited by examiner

FIG. 3E

Fix Document Conflicts

335

336 — Tags from Envelope 1      Tags from Envelope 2 — 338

Lorem ipsum dolor sit amet, consectetur adipiscing elit. Suspendisse justo libero, suscipit nec pharetra quis, blandit sit amet odio. Aliquam elementum rutrum placerat. Mauris consequat id eros gravida molestie. Sed facilisis ligula sem, a sollicitudin libero gravida ut. Vivamus orci orci, rhoncus ut pulvinar ut, dignissim vel leo. Vestibulum pharetra accumsan ligula id ornare. Vivamus dolor est, placerat nec euismod sed, dapibus euismod augue. Nulla viverra sodales risus in feugiat. Curabitur imperdiet tellus sed ipsum molestie, iaculis blandit felis elementum. Duis ac congue erat. Vestibulum convallis, tortor at vulputate ultricies, ante nisi pretium erat, at fringilla orci sem id tellus. Nunc quis dictum erat. Maecenas tristique justo vel mauris lacinia scelerisque.

Curabitur commodo erat urna, non hendrerit velit viverra quis. Etiam feugiat ultrices vestibulum. Integer vehicula sapien ut tempor bibendum. Phasellus magna enim, rutrum sed vestibulum vel, egestas vel sapien. Vestibulum a rhoncus ante, non pulvinar neque. In cursus feugiat quam, nec volutpat turpis pulvinar auctor. Praesent sit amet odio est. Pellentesque vulputate turpis nec quam faucibus rutrum.

[Initial 1]

[Initial 2]

[Sign Here]                                 [Date Here]
Signature                                    Date

[Sign Here]                                 [Date Here]
Signature                                    Date

MERGE TAGS — 339

```
┌─────────────────────────────────────────────────────────────────────┐
│  Generate a first document package comprising a first set of documents │
│                                410                                   │
└─────────────────────────────────────────────────────────────────────┘
                                  │
                                  ▼
┌─────────────────────────────────────────────────────────────────────┐
│ Generate a second document package comprising a second set of documents │
│                                420                                   │
└─────────────────────────────────────────────────────────────────────┘
                                  │
                                  ▼
┌─────────────────────────────────────────────────────────────────────┐
│   Receive a request to merge the first document package and the second document │
│                              package                                 │
│                                430                                   │
└─────────────────────────────────────────────────────────────────────┘
                                  │
                                  ▼
┌─────────────────────────────────────────────────────────────────────┐
│ In response to receiving the request to merge, identify a first subset of documents │
│  included in both the first set of documents and the second set of documents and  │
│  identifying a second subset of documents with conflicts between the first set of │
│               documents and the second set of documents              │
│                                440                                   │
└─────────────────────────────────────────────────────────────────────┘
                                  │
                                  ▼
┌─────────────────────────────────────────────────────────────────────┐
│ Rectify the second subset of documents to cure the conflicts between the first set of │
│               documents and the second set of documents              │
│                                450                                   │
└─────────────────────────────────────────────────────────────────────┘
                                  │
                                  ▼
┌─────────────────────────────────────────────────────────────────────┐
│ Generate a merged document package including the first subset of documents and │
│             the rectified second subset of documents                 │
│                                460                                   │
└─────────────────────────────────────────────────────────────────────┘
                                  │
                                  ▼
┌─────────────────────────────────────────────────────────────────────┐
│  In response to the merged document package being executed by a first party and a │
│ second party, convert the executed merged document package into an executed first │
│  document package including an executed first set of documents and an executed │
│     second document package including an executed second set of documents │
│                                470                                   │
└─────────────────────────────────────────────────────────────────────┘
```

FIG. 4

DOCUMENT PACKAGE MERGE IN DOCUMENT MANAGEMENT SYSTEM

CROSS REFERENCE TO RELATED APPLICATIONS

This application is a continuation of U.S. application Ser. No. 17/322,567, filed May 17, 2021, now U.S. Pat. No. 11,604,839, which is incorporated by reference in its entirety.

BACKGROUND

This disclosure relates generally to a document management system, and more specifically to merging document packages in a document management system.

Once agreement is reached between two or more parties (such as organizations, companies, individuals, groups, entities, or the like) regarding language, terms, or other contents of one or more documents, the parties may proceed to an execution phase for the one or more documents. During the execution phase, the documents may be incorporated into a document package that is provided to each party. In typical systems, one party solely is the originator of the document package. However, in many circumstances, two or more of the parties may desire to be the originator of the document package, for example due to internal policies or procedures of each party. This can cause significant delays and unnecessary confusion in the execution phase as the parties have to now negotiate who will be the originator.

SUMMARY

The merging of two or more document packages (also referred to as envelopes) during the execution of one or more documents within a document management system is described herein. To facilitate the execution of the one or more documents between multiple parties (e.g., between a first party and a second party), a centralized document system, in some embodiments, may provide a means for all parties to be an originator of a single document package. To do so, the centralized document system receives a request to merge the document packages (e.g., to merge a first document package with a second document package). Each document package includes a set of documents. The centralized document system identifies a first subset of documents that are included in all the document packages (e.g., in both the first document package and the second document package) and a second subset of documents with conflicts between the document packages. For example, the second subset of documents may include a document from each document package that is substantially similar except for a discrepancy in document content. The centralized document system rectifies the second subset of documents to cure the conflicts and generates a merged document package that includes the first subset and rectified second subset of documents. The centralized document system provides the merged document package, where each party is considered an originator, to each party for execution. In some embodiments, upon execution of the merged document package, the centralized document system converts the executed merged document package into an executed document package specific to each party.

In a first implementation, the centralized document system provides a means for any or all parties to an agreement to request to generate a merged document package. The centralized document system generates, in response to a request from a first party to an agreement, a first document package comprising a first set of documents. The centralized document system generates, in response to a request from a second party to the agreement, a second document package comprising a second set of documents. The centralized document system receives a request to merge the first document package and the second document package. In response to receiving the request to merge, the centralized document system identifies a first subset of documents included in both the first set of documents and the second set of documents and identifying a second subset of documents with conflicts between the first set of documents and the second set of documents. The centralized document system rectifies the second subset of documents to cure the conflicts between the first set of documents and the second set of documents. The centralized document system generates a merged document package including the first subset of documents and the rectified second subset of documents. In response to the merged document package being executed by the first party and the second party, the centralized document system converts the executed merged document package into an executed first document package including an executed first set of documents and an executed second document package including an executed second set of documents.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 3E illustrates a fifth example user interface for merging two document packages, according to at least one embodiment.

FIG. 3F illustrates a sixth example user interface for merging two document packages, according to at least one embodiment.

FIG. 4 is a flowchart illustrating a process for generating a merged document package, according to at least one embodiment.

Figure 1:
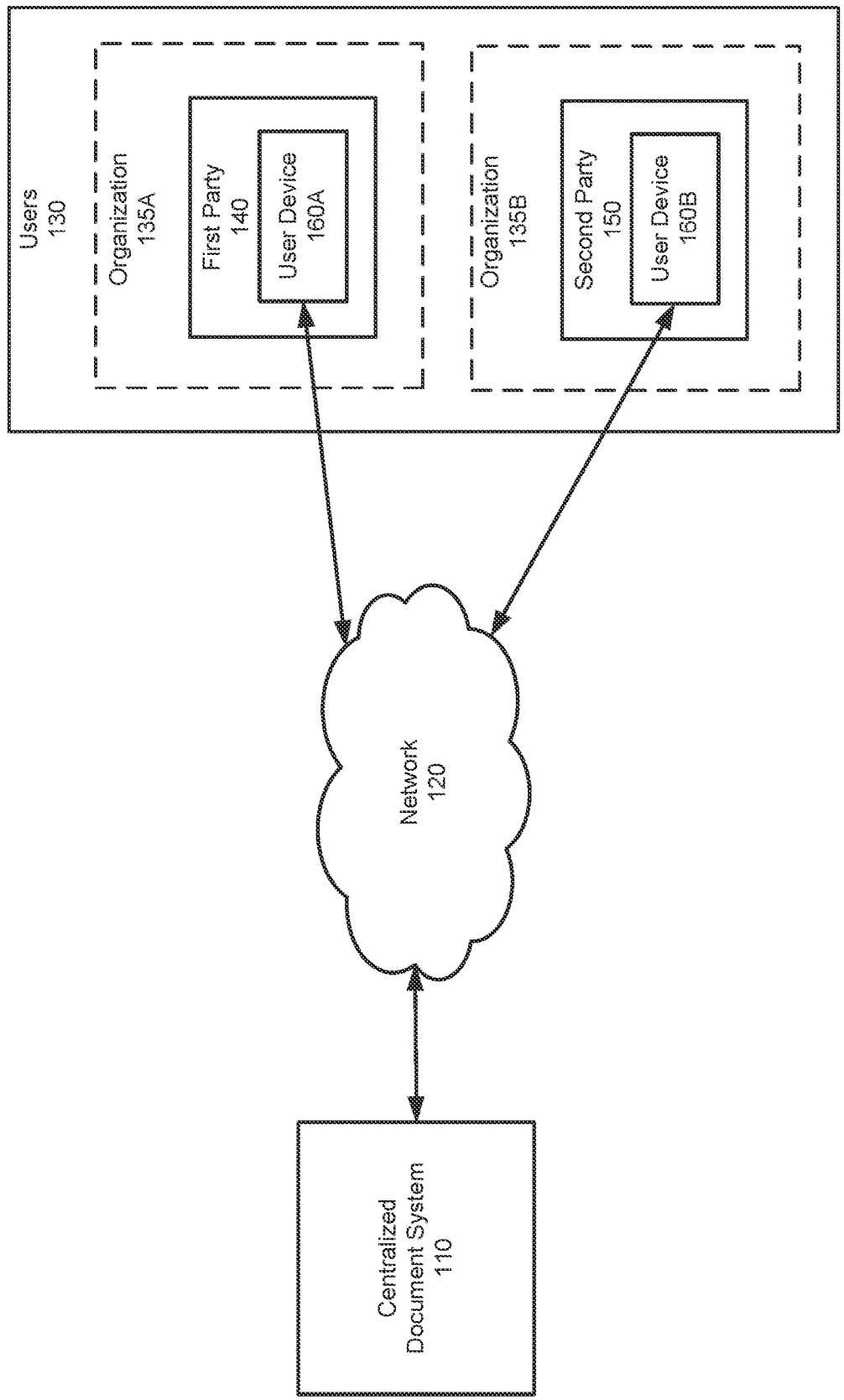
FIG. 1 is a block diagram of a system environment in which a centralized document system operates, according to at least one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables two or more parties (e.g., a first party of a first organization and a second party of a second organization) to create and send documents to each other for negotiation, collaborative editing, electronic execution (e.g., electronic signature), automation of contract fulfilment, archival, and analysis, among other tasks. Within the system environment, the parties may review content and/or terms presented in the documents during a negotiation phase, and in response to agreeing to the content and/or terms, can proceed to an execution phase where the parties electronically execute the documents. In some embodiments, in advance of the execution of the documents, a party (e.g., the first party) may generate a document package that includes the documents and provide the document package to the other parties for execution. This party (e.g., the first party) is considered an originator of the document package. Oftentimes, some or all of the parties desire to be an originator of their own document package that is to be executed by all parties. For example, to adhere to internal policies and procedures, both the first party and the second party desire to send their own document package to the other for execution. As such, the system environment enables a merged document package to be generated from the separate document packages of each party. The merged document package permits each party to be an originator of the merged document package and is provided to each party for execution.

The system environment described herein can be implemented within a centralized document system, an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform. It should also be noted that "centralized document system", "document management system", and other similar terminology are used interchangeably herein.

FIG. 1 is a block diagram of a system environment in which a centralized document system operates, according to at least one embodiment. The system environment 100 shown in FIG. 1 comprises a centralized document system 110, a network 120, a plurality of users 130 which includes a first party 140 associated with a first organization 135A and a second party 150 associated with a second organization 135B, each party associated with a user device 160 (e.g., a first party 140 is associated with user device 160A and a second party 150 is associated with user device 160B). In alternative configurations, different and/or additional components may be included in the system environment 100.

The centralized document system 110 is a computer system (or group of computer systems) for storing and managing documents and/or document packages (also referred to as envelopes) for a plurality of users 130. Using the centralized document system 110, users 130 can collaborate to create, edit, review, negotiate, and execute documents. A document may be a contract, agreement, purchase order, or any other document.

Prior to execution of the documents, the centralized document system 110 may generate a document package to include the documents for execution. In some embodiments, the documents may have been previously negotiated by two or more users 130 (e.g., by the first party 140 and the second party 150). In an example implementation, the centralized document system 110 may generate a first document package per a request from the first party 140 of organization 135A. The first party 140 and/or the organization 135A being an originator of the first document package. The first document package to include a first set of documents (e.g., to include the documents previously negotiated by the first party 140 and the second party 150) and a first set of acting entities. The first set of acting entities may be a set of users 130 at organization 135B that can view, edit, and/or execute the first set of documents. The centralized document system 110 may provide the first document package to the second party 150 for execution. Prior to receiving the first document package or after receiving the first document package, the centralized document system 110 may generate a second document package per a request from the second party 150 of organization 135B. The second party 150 and/or the organization 135B being an originator of the second document package. The second document package to include a second set of documents and a second set of acting entities.

The second set of acting entities may be a set of users 130 at organization 135A that can view, edit, and/or execute the second set of documents.

The centralized document system 110 provides a means for generating a merged document package (also referred to as a merged envelope). The merged document package allows for both the first party 140 and/or the organization 135A and the second party 150 and/or the organization 135B to be the originator of the merged document package. The centralized document system 110 generates the merged document package based on receiving a request from the first party 140 and/or the second party 150. To generate the merged document package, the centralized document system identifies a first subset of documents included in both the first set of documents and the second set of documents and identifies a second subset of documents with conflicts between the first set of documents and the second set of documents. The centralized document system 110 then rectifies the second subset of documents to cure the conflicts between the first set of documents and the second set of documents. The merged document package includes the first subset of documents and the rectified second subset of documents. The centralized document system 110 provides the merged document package to both the first party 140 and the second party 150 for execution. In some embodiments, the centralized document system 110 converts an executed merged document package into an executed first document package including an executed first set of documents and an executed second document package including an executed second set of documents to be provided to the first party 140 and the second party 150, respectively.

The centralized document system 110 can be a server, server group or cluster (including remote servers), or another suitable computing device or system of devices. In some implementations, the centralized document system 110 can communicate with user devices 160 over the network 120 to receive instructions and send document packages (or other information) for viewing on user devices 160. The centralized document system 110 will be discussed in further detail with respect to FIG. 2.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the centralized document system 110 can communicate with user devices 160 associated with the users 130. A user 130 can represent an individual, group, entity, or other party that is able to interact with document packages (or other content) generated on and/or managed by the centralized document system 110. Each user 130 can be associated with a username, email address, or other identifier that can be used by the centralized document system 110 to identify the user 130 and to control the ability of the user 130 to view, modify, and otherwise interact with document packages managed by the centralized document system 110. In some implementations, users 130 can interact with the centralized document system 110 through a user account with the centralized document system 110 and one or more user devices 160 accessible to that user 130. In the embodiment of FIG. 1, the plurality of users 130 are split into users associated with organization 135A and users associated with the organization 135B.

As described above, an organization 135 is a business, company, group, party, entity, individual, or the like that is associated with a set of users 130. For example, the organization 135A includes the first party 140 which, as used herein, is a user 130 who has a user account with the centralized document system 110. The organization 135B includes the second party 150 which, as used herein, is a user 130 who has a user account with the centralized document system 110. Each organization 135A, 135B may be associated with one or more policies or procedures that dictate how each organization 135A, 135B manages the creation and execution of one or more documents. For example, organization 135A may have a policy that specifies that the organization 135A is to be an originator on all executed documents they are party to. Each organization 135A, 135B is also associated with one or more document packages in the centralized document system 110. For example, the first document package may originate at organization 135A and be sent to organization 135B for viewing, editing, and execution, thus both organization 135A and organization 135B are associated with the first document package.

Each user device 160 is a computing device capable of receiving user input (for example from a user 130) as well as transmitting and/or receiving data to the centralized document system 110 via the network 120. For example, a user device 160 can be a desktop or a laptop computer, a smartphone, tablet, or another suitable device. User devices 160 are configured to communicate via the network 120 (for example, with the centralized document system 110). In one embodiment, a user device 160 executes an application allowing a user 130 of the user device 160 to interact with the centralized document system 110. For example, a user device 160 can execute a browser application to enable interaction between the user device 160 and the centralized document system 110 via the network 120. In some embodiments, a single user 130 can be associated with multiple user devices 160, and/or one user device 160 can be shared between multiple users 130 who may, for example, log into a personal account on the user device 160 to access the centralized document system 110.

Example Centralized Document System Architecture

Figure 2:
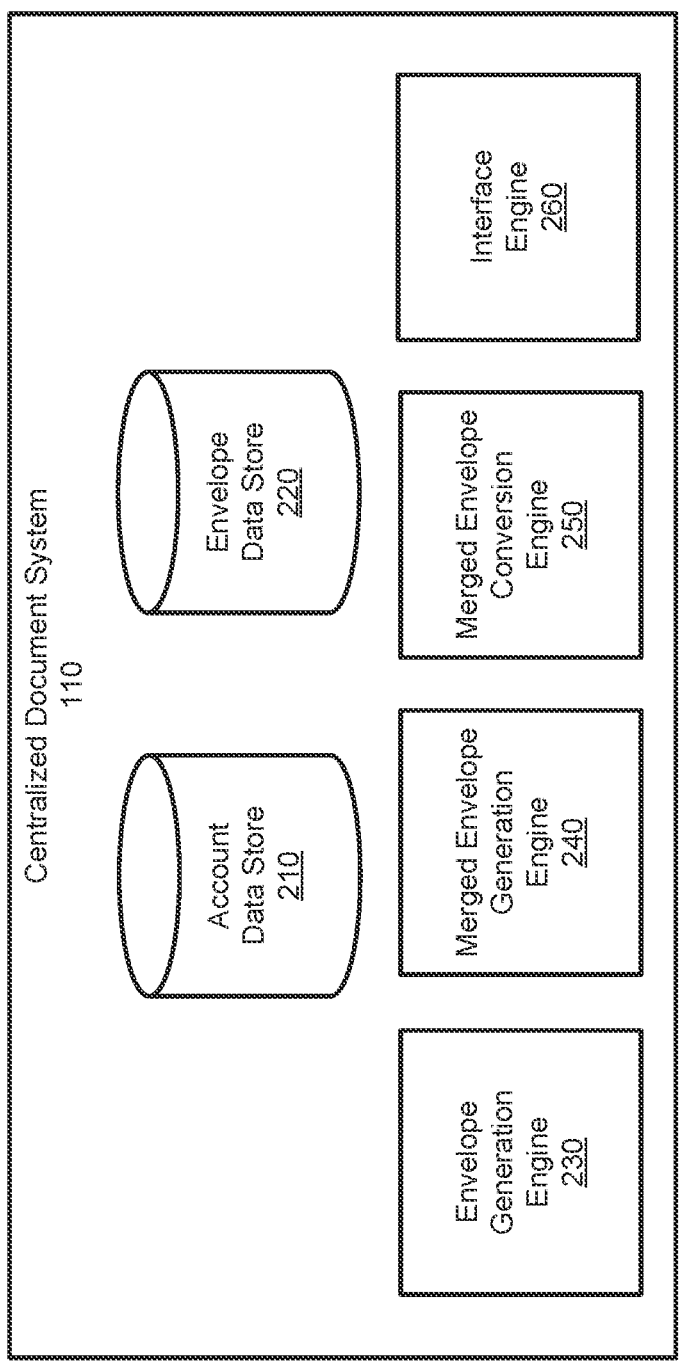
FIG. 2 is a block diagram of a centralized document system, according to at least one embodiment.

FIG. 2 is a block diagram of a centralized document system, according to one embodiment. Components of the centralized document system 110 may be a combination of hardware and software. The centralized document system 110 may include an account data store 210, an envelope data store 220, an envelope generation engine 230, a merged envelope generation engine 240, a merged envelope conversion engine 250, and an interface engine 260. In various embodiments, the centralized document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the centralized document system 110 may be distributed among the components in a different manner than described.

The account data store 210 is a file storage system, database, set of databases, or other data storage system storing information associated with accounts of the centralized document system 110. Organizations 135 may be associated with one or more accounts with the centralized document system 110. In some embodiments, an organization 135 may be associated with a parent account and each party within the organization 135 may be associated with a user account. For example, organization 135B has a parent account and the second party 150 within organization 135B has a user account with the centralized document system 110. Each user account associated with a party may include information about the party, such as information about the individual with access to the user account, age of the account, frequency of account use, log of past account transactions, and the like. Information about the individual with access to the account may include the individual's name, email address, title, role, department, and the like. The parent account and/or the user account may be associated with one or more policies or procedures of the organization 135. A policy or procedure of the organization 135 is a system of principles that guide certain processes or workflows for the organization 135. For example, a policy of organization 135B may dictate that the organization 135B is to be an originator on all associated document packages.

The envelope data store 220 is a file storage system, database, set of databases, or other data storage system storing information associated with envelopes (also referred to as document packages). Organizations 135 provide one or more documents for execution to other organizations 135 via envelopes. An envelope can include at least one document for execution. The at least one document may have been previously negotiated by the organizations 135 during a negotiation phase. And, as such, the document(s) may be ready for execution upon the creation of an envelope. The envelope may also include a set of acting entities. The set of acting entities include who at a receiving organization 135 can view, edit, and/or execute the document(s) included in the envelope. For example, an envelope is created by organization 135A and includes a set of acting entities at organization 135B who can view and execute the documents. The set of acting entities may designate who via recipient information (e.g., contact information for the one or more acting entities). Contact information may include a name and email address.

Information about an envelope stored in the envelope data store 220 may include document information specific to each document included in the envelope. For example, document information may include document type, document content, and document tags. Document type may provide identification information about the document, such as a document name, a document hash value or other numerical identifier, and/or a document category. The document category describes a topic of the document and may include purchase agreement, contract, employee agreement, bank form, permission slip, non-disclosure agreement, checklist, instruction set, code of conduct, term sheet, etc. The document content is all the words, images, logos, etc. included within the document. The document tags indicate which fields of the document need to be completed for execution (e.g., where an acting entity or acting entities should sign, date, or initial the document).

The envelope generation engine 230 generates an envelope for a user 130 for sending to a different user 130. An envelope, as described above, includes a set of documents for execution and a set of acting entities. For example, the envelope generation engine 230 may generate an envelope for organization 135A to send to organization 135B. In this example, organization 135A is an originator of the envelope.

In a specific example implementation, the envelope generation engine 230 may receive a request from the first party 140 of organization 135A to generate a first envelope (also referred to as a first document package) that is sent to a second party 150 of organization 135B. The first envelope includes a first set of documents and a first set of acting entities. The first party 140 and/or the organization 135A is the originator of the first envelope.

In some embodiments, after providing the envelope to the different user(s) 130, the envelope generation engine 230 may receive a request from a different user 130 to generate an envelope. Referring to the specific example implementation described above, the first envelope was provided to the second party 150 and the envelope generation engine 230 then receives a request from the second party 150 of organization 135B to generate a second envelope (also referred to as a second document package). The second envelope includes a second set of documents for execution and a second set of acting entities. The second party 150 and/or the organization 135B is the originator of the second envelope. In an embodiment described in more detail below, the envelope generation engine 230 may automatically generate an envelope for the different user 130 based on one or more policies of that user 130.

The merged envelope generation engine 240 manages merging two or more distinct envelopes to generate a merged envelope (also referred to as a merged document package). In some embodiments, the merged envelope generation engine 240 may generate the merged envelope in response to receiving a request from one or more users 130. Referring to the specific example implementation described above, the merged envelope generation engine 240 may receive a request from the second party 150 to merge the first envelope and the second envelope that had previously been generated via the envelope generation engine 230.

In some embodiments, the merged envelope generation engine 240 may generate the merged envelope automatically based on one or more polices associated with the one or more users 130. In some embodiments, the envelope generation engine 230 first automatically generates an envelope for a user 130 based on the one or more policies and the merged envelope generation engine 240 automatically generates the merged envelope. Referring to the specific example implementation described above, the merged envelope generation engine 240 automatically generates a merged envelope based on a policy associated with the second party 150 and/or the organization 135B that dictates the second party 150 or the organization 135B is to be an originator of any envelope that is to be executed by the second party 150. Thus, any envelope received by the second party 150 or any other party within organization 135B, will automatically trigger the envelope generation engine 230 to generate the second envelope and the merged envelope generation engine 240 to generate the merged envelope. Regardless of whether the merged envelope generation engine 240 receives a request to generate the merged envelope or automatically generates the merged envelope, the merged envelope generation engine 240 merges the first envelope and the second envelope to generate the merged envelope to be provided to both the first and second parties 140, 150. The merged envelope provides a benefit to both the first party 140 and the second party 150 in that both parties 140, 150 and/or their corresponding organizations 135A, 135B are the originator of the merged envelope.

In some embodiments, the merged envelope generation engine 240 creates a merged envelope identifier that uniquely identifies the merged envelope. The merged envelope identifier provides a layer of security for the one or more users 130. The merged envelope identifier accompanies the merged envelope when the merged envelope is provided to different users.

The merged envelope generation engine 240 generates the merged envelope by first identifying at least two subsets of documents. To do so, the merged envelope generation engine 240 may scan the documents included in each distinct envelope and identify documents with a same document type. The merged envelope generation engine 240 scans the document content and the document tags of the documents. The merged envelope generation engine 240 compares the document content and document tags within each document of a same document type to the document content and document tags within other documents of the same document type. The merged envelope generation engine 240 generates a first subset of documents to include documents of a same document type that also have similar document content and similar document tags. Similar document content indicates that the documents of a same document type have similar (matching) words, images, logos, etc. within the documents. Similar document tags indicate that the documents of a same document type have similar (matching) document tags within the documents. In some embodiments, the merged envelope generation engine 240 determines that documents of a same document type have similar document content by determining if an intent of language used (words used) in the documents is similar even though the words may not be identical or matching. For example, words, such as "20 units for 5% discount" and "5% discount for 20 units" are not considered identical as an ordering of the words is different causing the words to not be matching. However, the intent is similar. The merged envelope generation engine 240 may utilize known language processing techniques to determine similar intent. The merged envelope generation engine 240 generates a second subset of documents to include documents of a same document type that have conflicts in document content and/or document tags. A conflict is any discrepancy between document content and/or document tags within a document of a document type and a corresponding document of the same document type. A discrepancy includes additional document content, additional document tags, missing document content, and/or missing document tags.

Referring to the specific example implementation described above, the merged envelope generation engine 240 may receive a request from the second party 150 to merge the first envelope and the second envelope to generate the merged envelope. The first envelope includes three documents and the second envelope includes two documents. The first envelope includes a first document with document category of non-disclosure agreement, a second document with document category of purchase agreement, and a third document with document category of checklist. The second envelope includes a first document with document category of non-disclosure agreement and a second document with document category of purchase agreement. The merged envelope generation engine 240 scans the documents included in both envelopes to identify that the first documents are of a same document type (i.e., document category of non-disclosure agreement) and the second documents are of a same document type (i.e., document category of purchase agreement). The merged envelope generation engine 240 further scans the document content and the document tags within the first and second documents. The merged envelope generation engine 240 compares the document content and the document tags of documents of a same document type. Thus, the merged envelope generation engine 240 compares the document content and the document tags of the first document (non-disclosure agreement) of the first envelope to the document content and the document tags of the first document (non-disclosure agreement) of the second envelope. The merged envelope generation engine 240 also compares the document content and the document tags of the second document (purchase agreement) of the first envelope to the document content and the document tags of the second document (purchase agreement) of the second envelope. The merged envelope generation engine 240 determines that the document content and the document tags of the first documents are similar and that the document content and the document tags of the second documents contain several conflicts. For example, the second document (purchase agreement) in the first envelope includes an additional contingency clause that is not present in the second document (purchase agreement) in the second envelope. Thus, the first documents are placed in the first subset and the second documents are placed in the second subset.

The merged envelope generation engine 240 rectifies the second subset of documents to cure the conflicts. When the conflicts include a discrepancy in document content, the merged envelope generation engine 240 cures the conflicts by determining which content to include in a rectified document of the rectified second subset. In some embodiments, the merged envelope generation engine 240 requires one or more users 130 to designate which document content to include in the rectified document. In some embodiments, the merged envelope generation engine 240 determines which content to include automatically, for instance based on an analysis of content included when historical discrepancies have occurred between similar entities or similar documents. When the conflicts include a discrepancy in document tags, the merged envelope generation engine 240 cures the conflicts by combining the document tags and including the combined document tags in a rectified document of the rectified second subset. Once the conflicts are rectified, the merged envelope generation engine 240 generates the merged envelope to include the first subset of documents and the rectified second subset of documents.

Referring to the specific example implementation described above, the merged envelope generation engine 240 rectifies the second subset of documents which includes the second documents (the purchase agreements from both envelopes). To do so, the merged envelope generation engine 240 provides both of the second documents (both of the purchase agreements) to the second entity 150 for review. The second entity 150 provides feedback (e.g., via user device 160B) regarding the document content to be included in a rectified document (a rectified purchase agreement). The second entity 150 may approve to include the contingency clause present in the purchase agreement of the first envelope. Thus, the rectified document will include the additional document content and the second subset of documents is considered rectified.

In some embodiments, the merged envelope generation engine 240 identifies a third subset of documents. The third subset of documents includes one or more documents from one or more distinct envelopes for which a same document type was not identified in the other distinct envelopes. The third subset of documents includes documents that do not need to be executed. For example, the third subset of documents may include checklists or instructions that are internal documents for a party or organization. The merged envelope generation engine 240 includes the third subset of documents in the merged envelope if a third subset of documents was identified. Referring to the specific example implementation described above, the merged envelope generation engine 240 determine a third subset of documents to include the third document from the first envelope (i.e., the third subset of documents includes the third document with document category of checklist).

The merged envelope generation engine 240 combines the sets of acting entities included in each distinct envelope into a merged set of acting entities to be included in the merged envelope. Referring to the specific example implementation described above, the first envelope comprises a first set of acting entities and the second envelope comprises a second set of acting entities. The merged envelope generation engine 240 combines the first set of acting entities and the second set of acting entities to generate a merged set of acting entities for the merged envelope.

The merged envelope generation engine 240 may provide the merged envelope to each party associated with the distinct envelopes for approval. The merged envelope generation engine 240 may instruct the interface engine 260 to display the merged envelope to the entities via a user interface (e.g., a graphical user interface (GUI) of a user device). In some embodiments, the merged envelope generation engine 240 may provide the first subset of documents of the merged envelope to each party by providing only one document of each document type included in the first subset of documents. In some embodiments, the merged envelope generation engine 240 may provide the first subset of documents of the merged envelope to each party by providing only all documents of each document type included in the first subset of documents. The merged envelope generation engine 240 provides the rectified second subset of documents to each party when providing the merged envelope. The merged envelope generation engine 240 may provide further instructions to the interface engine 260 to display the merged envelope to each party based on whether or not a third subset of documents is included in the merged envelope. If a third subset of documents is included, each document included in the third subset of documents will only be visible to a party the document is associated with.

Referring to the specific example implementation described above, the merged envelope is provided to both the first party 140 and the second party 150 for approval via the user devices 160. The first party 140 is displayed the first subset, the rectified second subset, and the third subset of documents of the merged envelope. The second party 150 is displayed the first subset and the second subset of documents.

In response to the merged envelope being approved by each party, the merged envelope generation engine 240 provides the merged envelope for execution by each party. In some embodiments, the merged envelope generation engine 240 may not allow the parties to execute the documents within the merged envelope until approval has been received from some or all parties. If one or more parties does not approve the merged envelope, the merged envelope may be updated based on further collaboration or negotiation that takes place between the parties. For example, one or more documents in the rectified second subset of documents may need to be further negotiated. The merged envelope provided for execution by each party contains the same documents as the merged envelope provided for approval to each party.

The merged envelope conversion engine 250 receives an executed merged envelope (also referred to as an executed merged document package) and converts the executed merged envelope into distinct executed envelopes (also referred to as executed document packages). In some embodiments, the merged envelope conversion engine 250 may purge the distinct envelopes generated by the envelope generation engine 230 by replacing documents included in the envelopes with corresponding executed documents from the executed merged envelope.

Referring to the specific example implementation described above, the merged envelope conversion engine 250 receives the executed merged envelope from the first party and the second party. The merged envelope conversion engine 250 purges the documents included in the first envelope (i.e., the first document and the second document) and replaces them with the corresponding executed first document and executed second document. The third document remains in the first envelope. The first envelope is now considered an executed first envelope. The merged envelope conversion engine 250 purges the documents included in the second envelope (i.e., the first document and the second document) and replaces them with the corresponding executed first document and executed second document. The second envelope is now considered an executed second envelope.

The interface engine 260 generates user interfaces (e.g., GUIs) allowing users 130 to interact with envelopes managed by the centralized document system 110. The interface engine 260 provides a means for a user 130 to generate an envelope, view a received envelope, execute the received envelope, view executed envelope, request to merge two or more envelopes, approve a merged envelope, execute the merged envelope, view the executed merged envelope, etc. The interface engine 260 provides one or more interface elements (e.g., links, buttons, checkboxes, drop down menus, etc.) on an electronic display of a user device 160 for a user 130 to interact with providing instruction or feedback to the centralized document system 110 regarding the management of envelopes. The interface engine 260 and an example user interfaces will be discussed further below in relation to FIGS. 3A-3H.

Example User Interfaces

The example user interfaces illustrated in FIGS. 3A-3H illustrate an example scenario of merging a first envelope (also referred to as a first document package) with a second envelope (also referred to as a second document package). In this scenario, the first party 140 has generated and provided the first envelope to the second party 150 via the centralized document system 110. The second party 150 using a user device 160B views the following example user interfaces throughout the process of merging the two envelopes performed by the centralized document system 110.

Figure 3A:
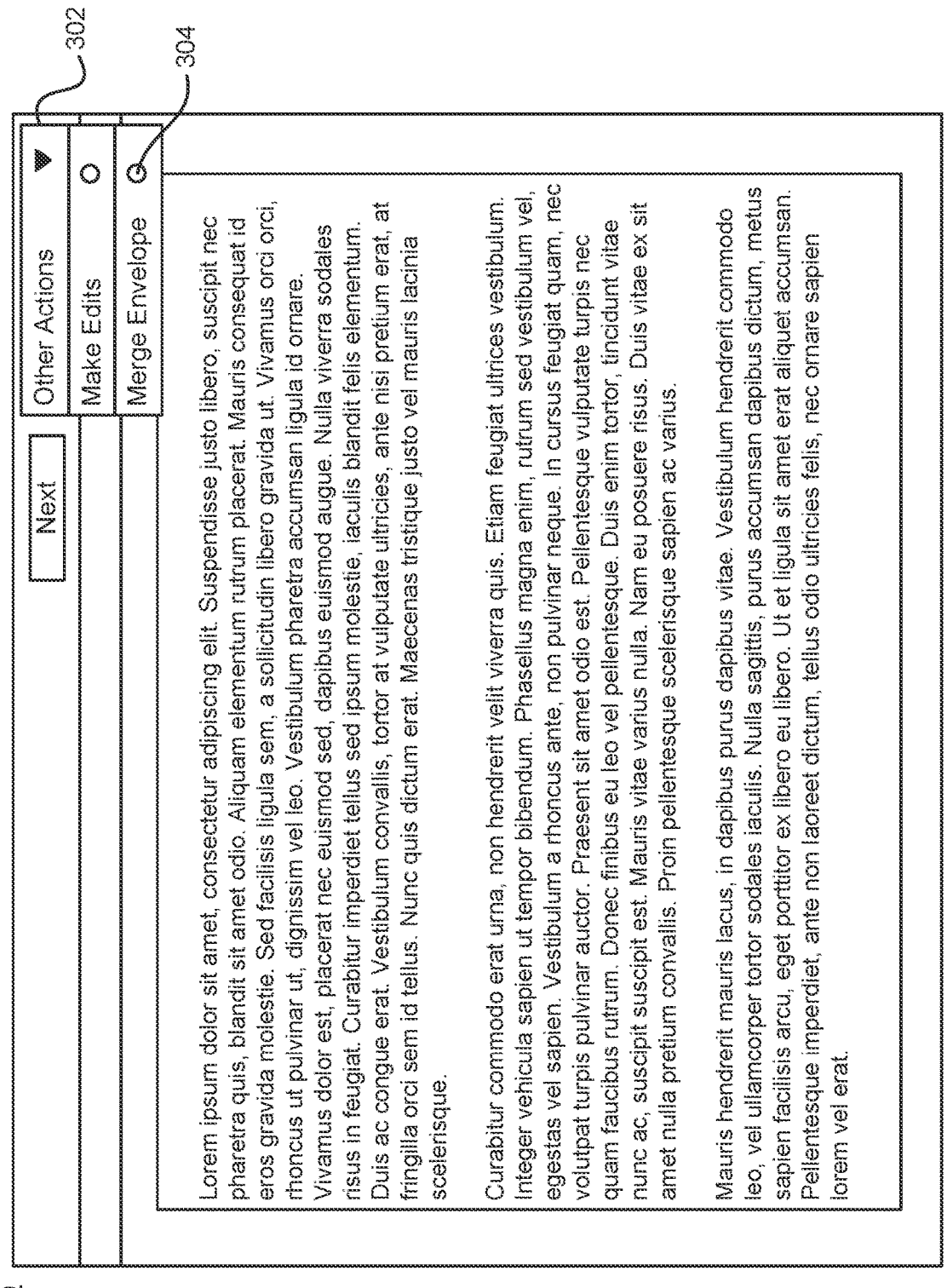
FIG. 3A illustrates a first example user interface for merging two document packages, according to at least one embodiment.

FIG. 3A illustrates a first example user interface for merging two envelopes, according to at least one embodiment. The first example user interface 300 displays actions that can be performed on an envelope. The first example user interface 300 may be displayed by the interface engine 260 to the second party 150 when the second party 150 is viewing the first envelope. The user interface 300 includes a set of actions 302 the second party 150 may request the centralized document system 110 perform on the first envelope. The set of actions 302 may include a merge envelope option among others. To view the set of actions 302 the second party 150 may select an interface element (e.g., a down arrow on a drop-down menu). To select the merge envelope option the second party 150 may select radial button 304 (another interface element). By selecting the radial button 304, the centralized document system 110 begins the process of merging the first envelope with a second envelope that corresponds to the second party 150. In alternative configurations, different and/or additional user interface elements may be included in the example user interface 300.

Figure 3B:
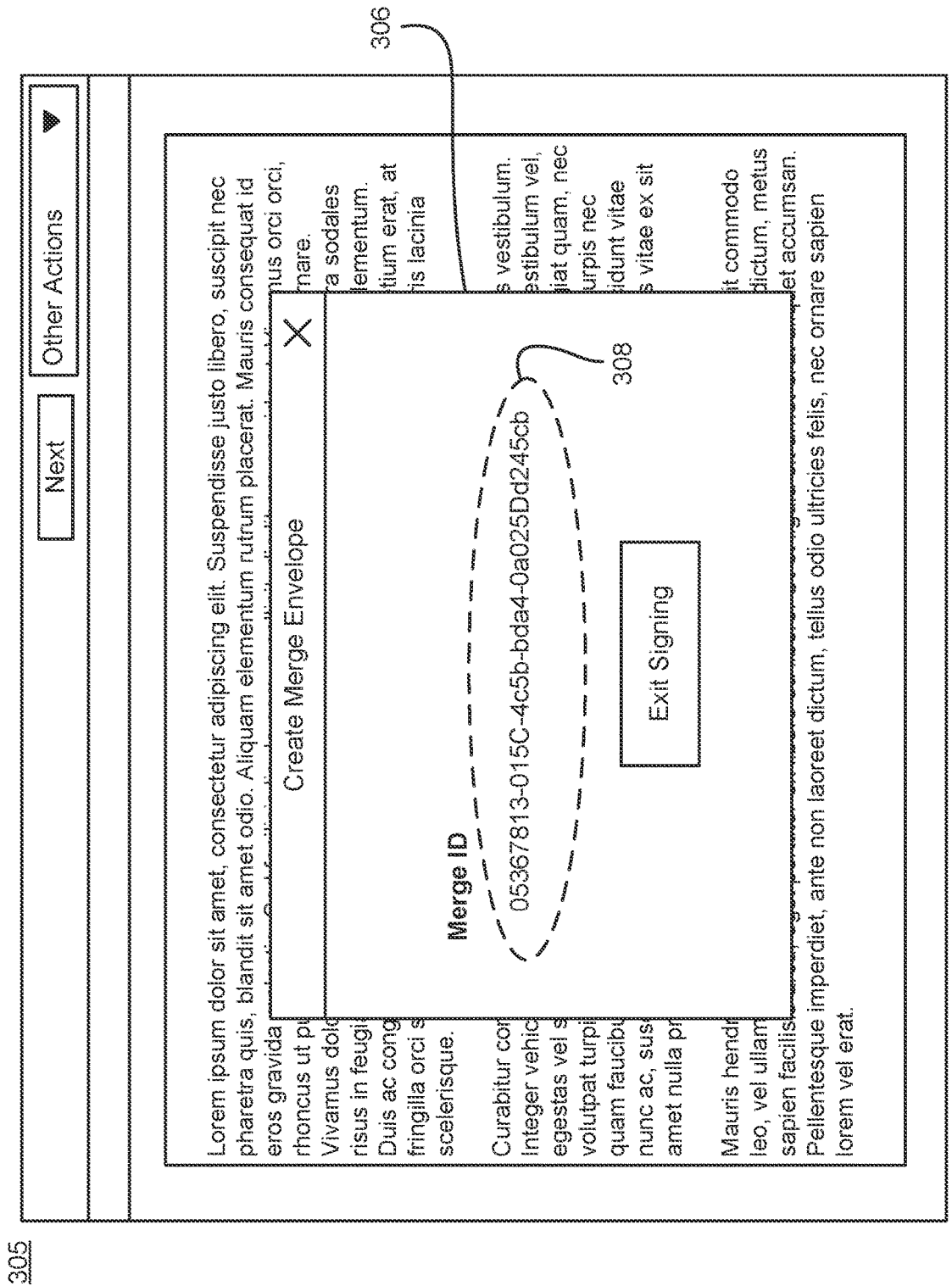
FIG. 3B illustrates a second example user interface for merging two document packages, according to at least one embodiment.

FIG. 3B illustrates a second example user interface for merging two envelopes, according to at least one embodiment. The second example user interface 305 displays creation of a merged envelope identifier. The second example user interface 305 may be displayed by the interface engine 260 as a result of the second party 150 selecting the radial button 304 to merge envelopes on the previous (first) example user interface 300. The second example user interface 305 includes a window 306 providing a merged envelope identifier 308 to the second party 150. The centralized document system 110 creates the merged envelope identifier 308 that uniquely identifies the envelope package. As described above, the merged envelope identifier 308 provides a layer of security for the first party 140 and the second party 150.

Figure 3C:
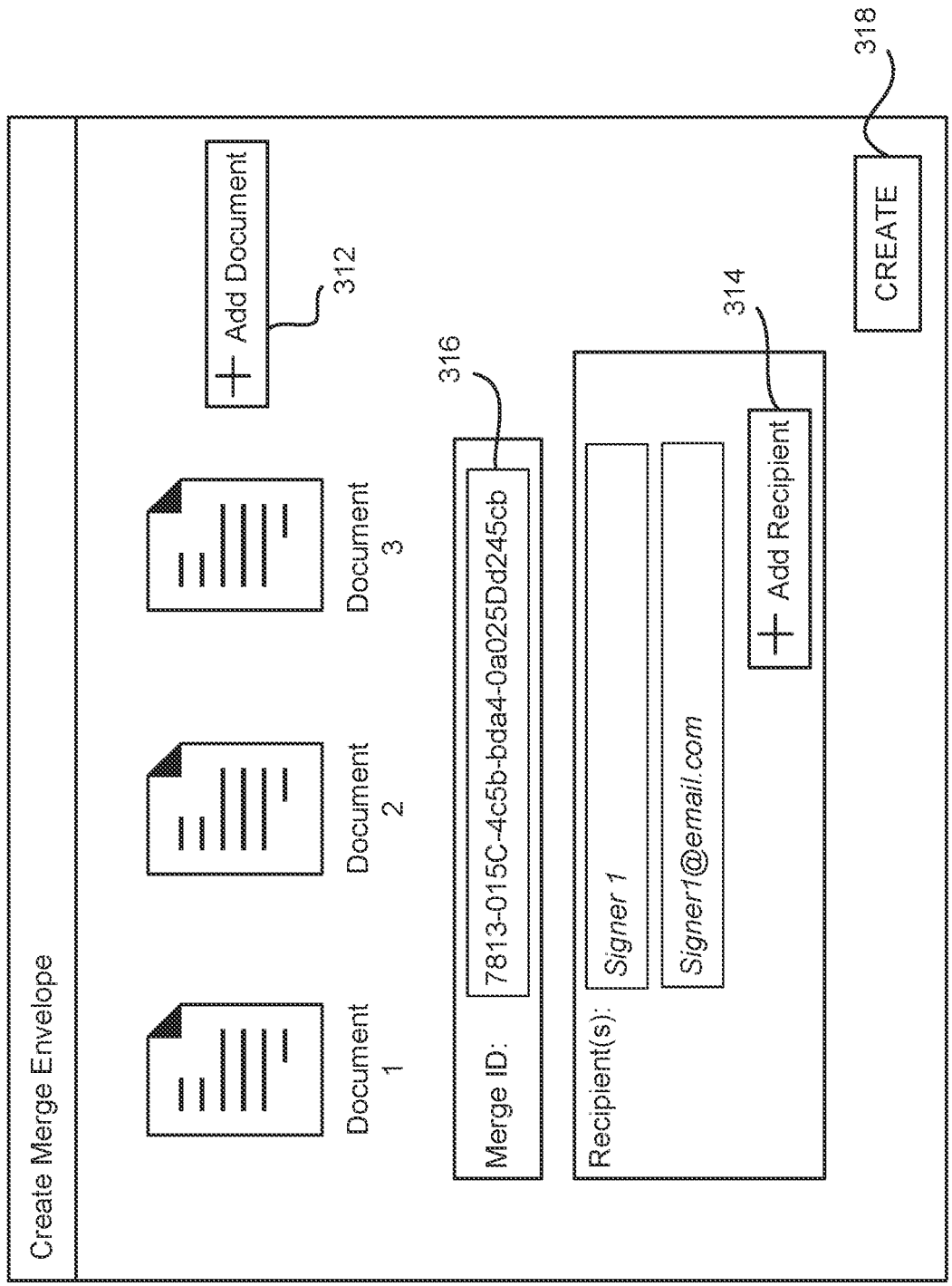
FIG. 3C illustrates a third example user interface for merging two document packages, according to at least one embodiment.

FIG. 3C illustrates a third example user interface for merging two envelopes, according to at least one embodiment. The third example user interface 310 displays creation of a second envelope that corresponds to the second party 150. The third example user interface 310 may be displayed by the interface engine 260 to the second party 150 providing the second party 150 an opportunity to add documents and/or add recipients to the second envelope prior to any merging. The second party 150 may decide to add documents to the set of documents (e.g., the second set of documents) by selecting button 312. The second party 150 may decide to add recipients by selecting button 314 and providing recipient information in one or more text boxes. The second party 150 inputs the merged envelope identifier 308 into a text box 316 and selects button 318 to signify to the centralized document system 110 that the second envelope is to be merged with the first envelope to create the merged envelope.

Figure 3D:
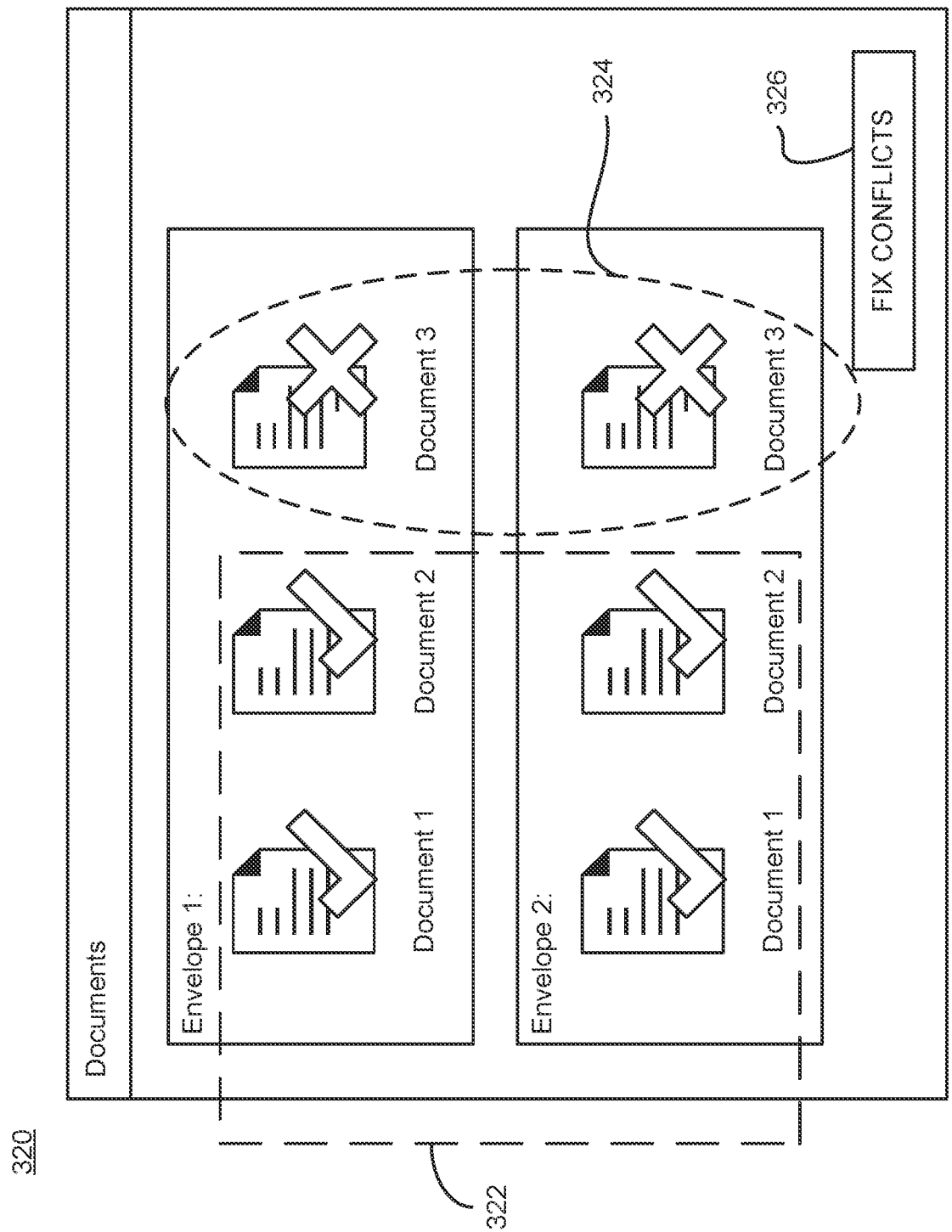
FIG. 3D illustrates a fourth example user interface for merging two document packages, according to at least one embodiment.

FIG. 3D illustrates a fourth example user interface for merging two envelopes, according to at least one embodiment. The fourth example user interface 320 displays an overview of the sets of documents (e.g., the first set of documents and the second set of documents) included in the first envelope and the second envelope, respectively. The fourth example user interface 320 may be displayed by the interface engine 260 to the second party 150 notifying the second party 150 that a document of a similar document type (i.e., Document 3) included in the first envelope and the second envelope includes conflicts as determined by the centralized document system 110 (e.g., via the merged envelope generation engine 240). In this illustrated embodiment, a first subset of documents 322 includes Documents 1 and Documents 2 and a second subset of documents 324 includes Documents 3. The second party 150 is provided an option (e.g., button 326) to fix the conflicts. By selecting button 326, the centralized document system 110 will rectify the conflicts in the second subset of documents 324.

Figure 3E:
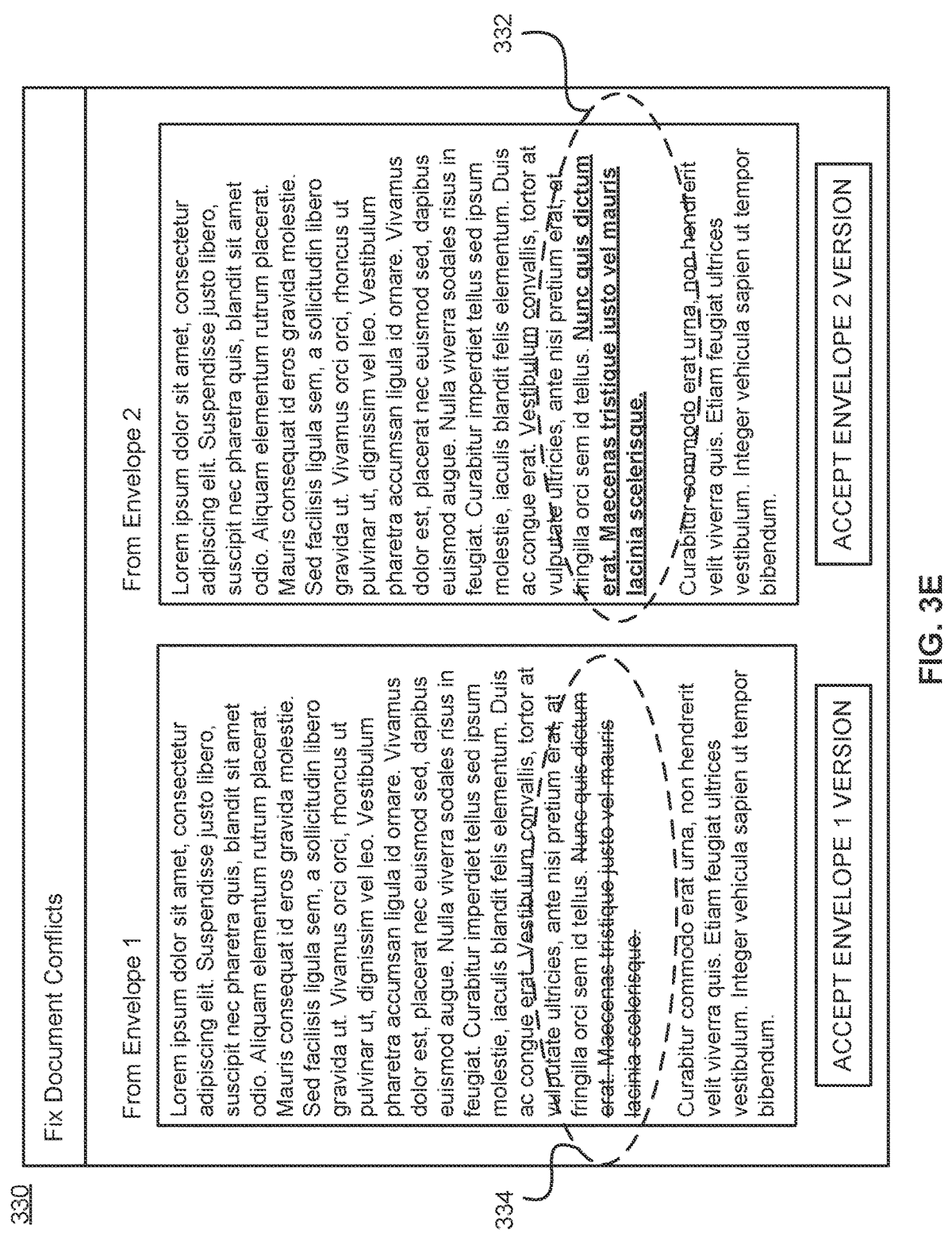

FIG. 3E illustrates a fifth example user interface for merging two envelopes, according to at least one embodiment. The fifth example user interface 330 displays rectifying a conflict between documents of the second subset of documents 324. The fifth example user interface 330 may be displayed by the interface engine 260 to the second party 150 highlighting a particular conflict (e.g., a discrepancy in document content) identified by the centralized document system 110. For example, document content 332 in a document (i.e., Document 3) of the second subset of documents 324 associated with the second envelope differs from document content 334 in a corresponding document (i.e., Document 3) associated with the first envelope. The second party 150 may accept the document content 332 or the document content 334 to be the document content included in a rectified document (i.e., a rectified Document 3) in a rectified second subset of documents. By accepting either the document content 332 or the document content 334, the centralized document system 110 cures the particular conflict accordingly.

FIG. 3F illustrates a sixth example user interface for merging two envelopes, according to at least one embodiment. The sixth example user interface 335 displays rectifying another conflict between documents of the second subset of documents 324. The sixth example user interface 335 may be displayed by the interface engine 260 to the second party 150 highlighting a particular conflict (e.g., a discrepancy in document tags) identified by the centralized document system 110. For example, all document tags in the document (i.e., Document 3) of the second subset of documents 324 are presented with the documents tags 336 being the tags in the document of the first envelope and the document tags 338 being the tags in the document of the second envelope. The document tags 336, 338 are different and thereby causing a discrepancy. The second party 150 may merge the document tags 336, 338 by selecting the button 339. The merged document tags are included in the rectified document (i.e., a rectified Document 3) in the rectified second subset of documents. By merging the document tags 336, 338, the centralized document system 110 cures the particular conflict accordingly.

Figure 3G:
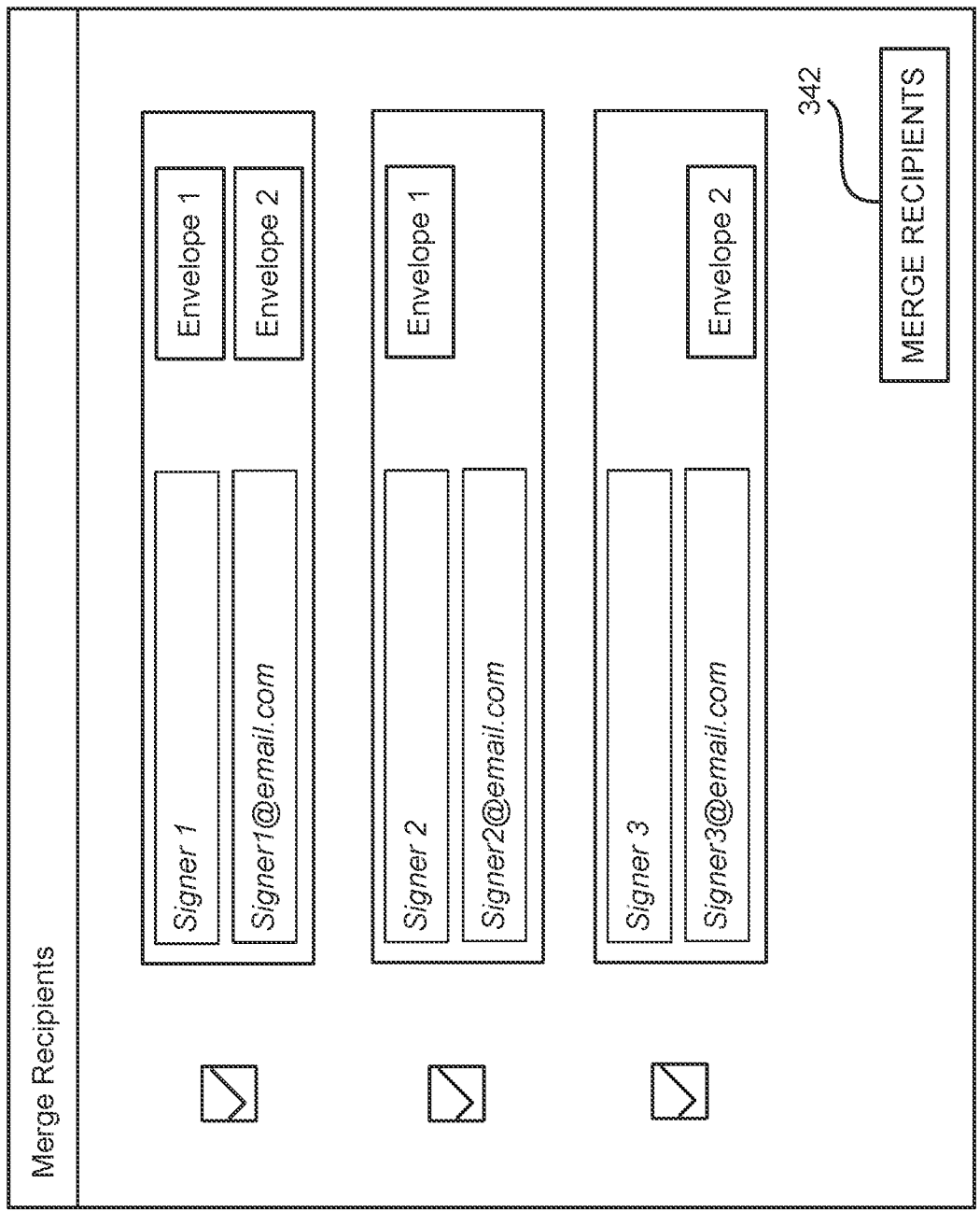
FIG. 3G illustrates a seventh example user interface for merging two document packages, according to at least one embodiment.

FIG. 3G illustrates a seventh example user interface for merging two envelopes, according to at least one embodiment. The seventh example user interface 340 displays merging a first set of acting entities of the first envelope with a second set of acting entities of the second envelope. The seventh example user interface 340 may be displayed by the interface engine 260 to the second party 150 providing the second party 150 an opportunity to merge the recipients (i.e., merge the sets of acting entities). For example, with a selection of button 342, the first set of acting entities which included Signer 1 and Signer 2 and the second set of acting entities which included Signer 2 and Signer 3 are merged into a merged set of acting entities.

Figure 3H:
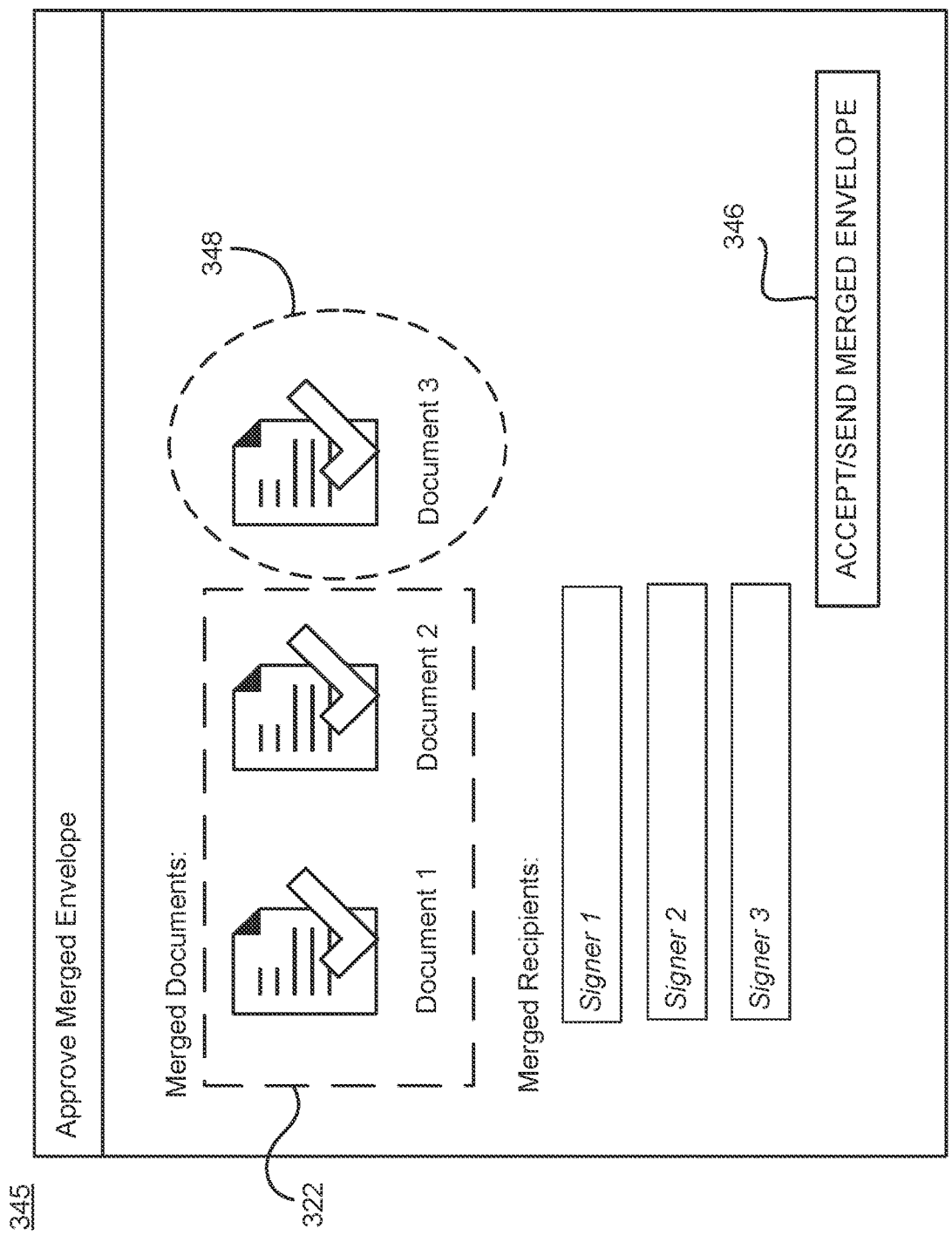
FIG. 3H illustrates an eighth example user interface for merging two document packages, according to at least one embodiment.

FIG. 3H illustrates an eighth example user interface for merging two envelopes, according to at least one embodiment. The eighth example user interface 345 displays the merged envelope to the second entity 150 for approval. The eighth example user interface 345 may be displayed by the interface engine 260 to the second party 150 providing the second party 150 an opportunity to approve (by selecting button 346) the merged envelope. The user interface 345 displays the first subset of documents 322 and the rectified second subset of documents 348 and the merged recipients (i.e., the merged set of acting entities) of the merged envelope. In embodiments (not shown), the merged envelope is displayed to the first party 140 by the interface engine 260 in a similar manner providing the first party 140 with an opportunity to approve the merged envelope.

Processes for Managing Merged Document Packages

FIG. 4 is a flowchart illustrating a process for generating a merged document package, according to at least one embodiment. The process shown in FIG. 4 may be performed by components of a centralized document system (e.g., the centralized document system 110). Other entities may perform some or all of the steps in FIG. 4 in other embodiments. It should be noted that in other embodiments, the process 400 illustrated in FIG. 4 can include fewer, additional, or different steps that those described herein.

The centralized document system generates 410 a first document package (also referred to as a first envelope) comprising a first set of documents. The centralized document system may generate the first document package in response to a request from a first party (e.g., the first party 140). The first set of documents may include at least one document for execution. The first document package includes a set of acting entities (e.g., a set of recipients at a second party 150) that will receive the first document package.

The centralized document system generates 420 a second document package (also referred to as a second envelope) comprising a second set of documents. The centralized document system may generate the second document package in response to a request from a second party (e.g., the second party 150). The second set of documents may correspond to the first set of documents. For example, one or more of the documents in the second set of documents are substantially similar to one or more documents in the first set of documents. The second document package includes a set of acting entities (e.g., a set of recipients at the first party 140) that will receive the second document package.

The centralized document system receives 430 a request to merge the first document package and the second document package. For example, the centralized document system may receive the request from either or both the first party and the second party. In a specific example, the centralized document system may provide the first document package to the second party and the second party may request the centralized document system merge the first document package and the second document package.

In response to receiving the request to merge, the centralized document system identifies 440 a first subset of documents included in the first set of documents and the second set of documents and a second subset of documents with conflicts between the first set of documents and the second set of documents. For example, the centralized document system may scan the documents included in the first set of documents and the second set of documents and identify documents included in both sets with a same document type. The centralized document system scans the document content and the document tags of each document of a same type and compares the document content and document tags within a first document of a first document type of the first set of documents to the document content and document tags within a second document of the same first document type of the second set of documents. The first subset of documents includes documents of a same document type that also have similar document content and similar document tags. The second subset of documents includes documents of a same document type that have conflicts in document content and/or document tags. A conflict is any discrepancy between document content and/or document tags within a document of a document type and a corresponding document of the same document type. A discrepancy includes additional document content, additional document tags, missing document content, and/or missing document tags.

The centralized document system rectifies 450 the second subset of documents to cure the conflicts between the first set of documents and the second set of documents. For example, when the conflicts include a discrepancy in document content, the centralized document system cures the conflicts by determining which content to include in a rectified document of a rectified second subset of documents. In some embodiments, the centralized document system requires the first party and/or the second party to designate which document content to include in the rectified document. In another example, when the conflicts include a discrepancy in document tags, the centralized document system cures the conflicts by combining the document tags and including the combined document tags in a rectified document of the rectified second subset of documents.

The centralized document system generates 460 the merged document package (also referred to as a merged envelope) including the first subset of documents and the rectified second subset of documents. The merged document package may be provided by the centralized document system to both the first and second parties for viewing, editing, approval, and execution.

In response to the merged document package being executed by the first party and the second party, the centralized document system converts 470 the executed merged document package into an executed first document package including an executed first set of documents and an executed second document package including an executed second set of documents.

Figure 5A:
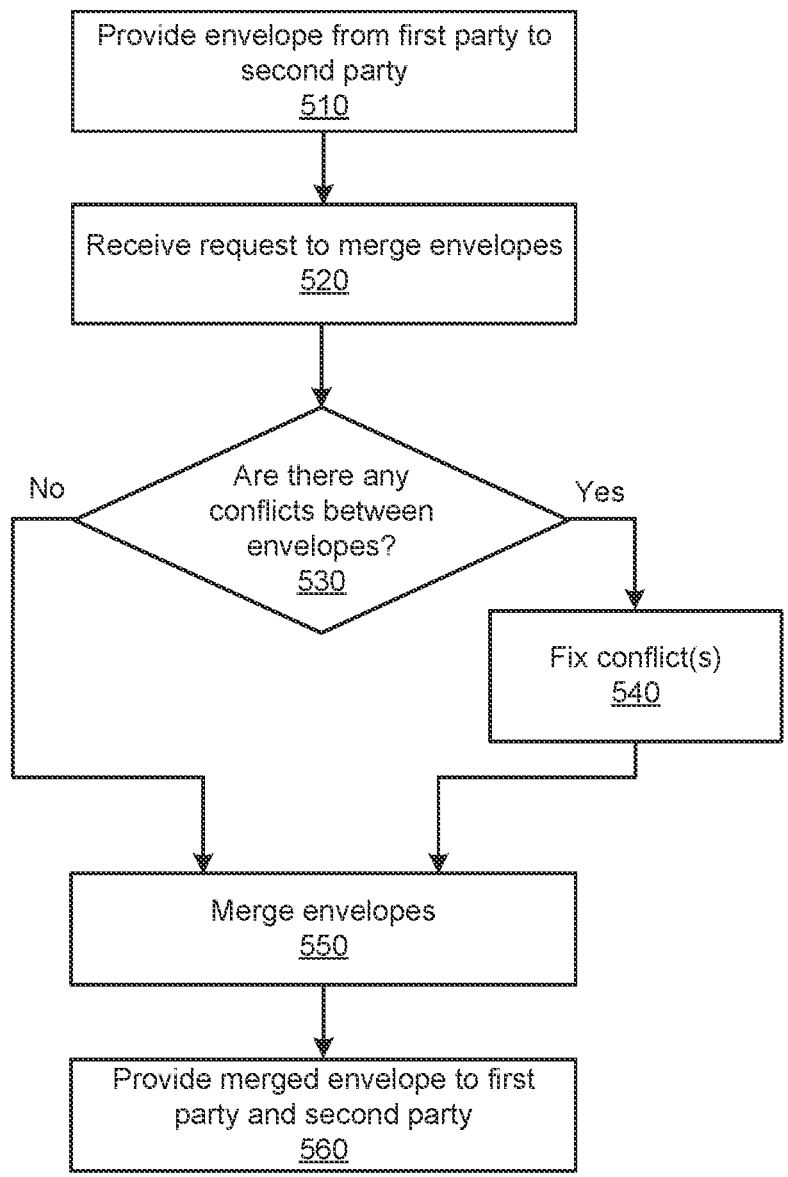
FIG. 5A is a flowchart illustrating an example process for creating and sending a merged document package, according to at least one embodiment.

FIG. 5A is a flowchart illustrating an example process for creating and sending a merged document package, according to one embodiment. The process 500 shown in FIG. 5A may be performed by components of a centralized document system (e.g., the centralized document system 110). Other entities may perform some or all of the steps in FIG. 5A in other embodiments. It should be noted that in other embodiments, the process 500 illustrated in FIG. 5A can include fewer, additional, or different steps that those described herein.

The centralized document system may provide 510 an envelope (also referred to as a document package) from a first party (e.g., the first party 140) to a second party (e.g., the second party 150). The envelope may be a first envelope that was generated by the centralized document system at the request of the first party. The centralized document system may display the envelope and its contents on a user interface of a user device (e.g., the user device 160B) associated with the second party. The centralized document system may receive 520 a request to merge envelopes. For example, the second party may create an envelope (e.g., a second envelope) and request it be merged with the envelope (e.g., the first envelope) originally received by the second party. In another example, the second party may create an envelope (e.g., a second envelope) and provide this envelope to the first party via the centralized document system. The first party may request the received envelope be merged with the envelope (e.g., the first envelope) originally provided to the second party. The centralized document system determines 530 if any conflicts exist between the envelopes (e.g., between the first envelope and the second envelope). With each envelope including a set of documents, the centralized document system inspects the set of documents for conflicts. For example, the centralized document system may compare document contents and/or document tags of the documents of the first envelope to document contents and/or document tags of the documents of the second envelope as described in more detail above in FIG. 2. If any conflicts exist, the centralized document system fixes 540 the conflicts. For example, the centralized document system may present the conflicts to the first party and/or second party on a user interface of a corresponding user device. If no conflicts exist or all the conflicts have been fixed, the centralized document system merges 550 the envelopes. The centralized document system may provide 560 the merged envelope (also referred to as a merged document package) to the first party and to the second party.

Figure 5B:
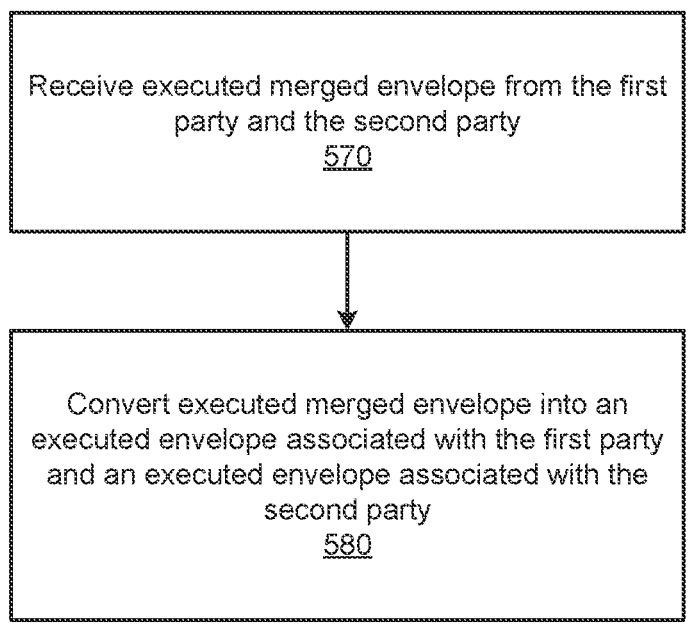
FIG. 5B is a flowchart illustrating an example process for receiving and converting the merged document package from FIG. 5A, according to at least one embodiment.

FIG. 5B is a flowchart illustrating an example process for receiving and converting the merged document package from FIG. 5A, according to at least one embodiment. The process 505 shown in FIG. 5B may be performed by components of a centralized document system (e.g., the centralized document system 110). Other entities may perform some or all of the steps in FIG. 5B in other embodiments. It should be noted that in other embodiments, the process 505 illustrated in FIG. 5B can include fewer, additional, or different steps that those described herein.

The centralized document system receives 570 the executed merged envelope (also referred to as an executed merged document package) from the first party and the second party. The centralized document system converts 580 the executed merged envelope into an executed envelope associated with the first party and an executed envelope associated with the second party. For example, the documents included in the original envelope provided by the first party may be purged and replaced with executed documents from the executed merged envelope, thereby causing the original envelope to become an executed envelope associated with the first party.

Figure 6A:
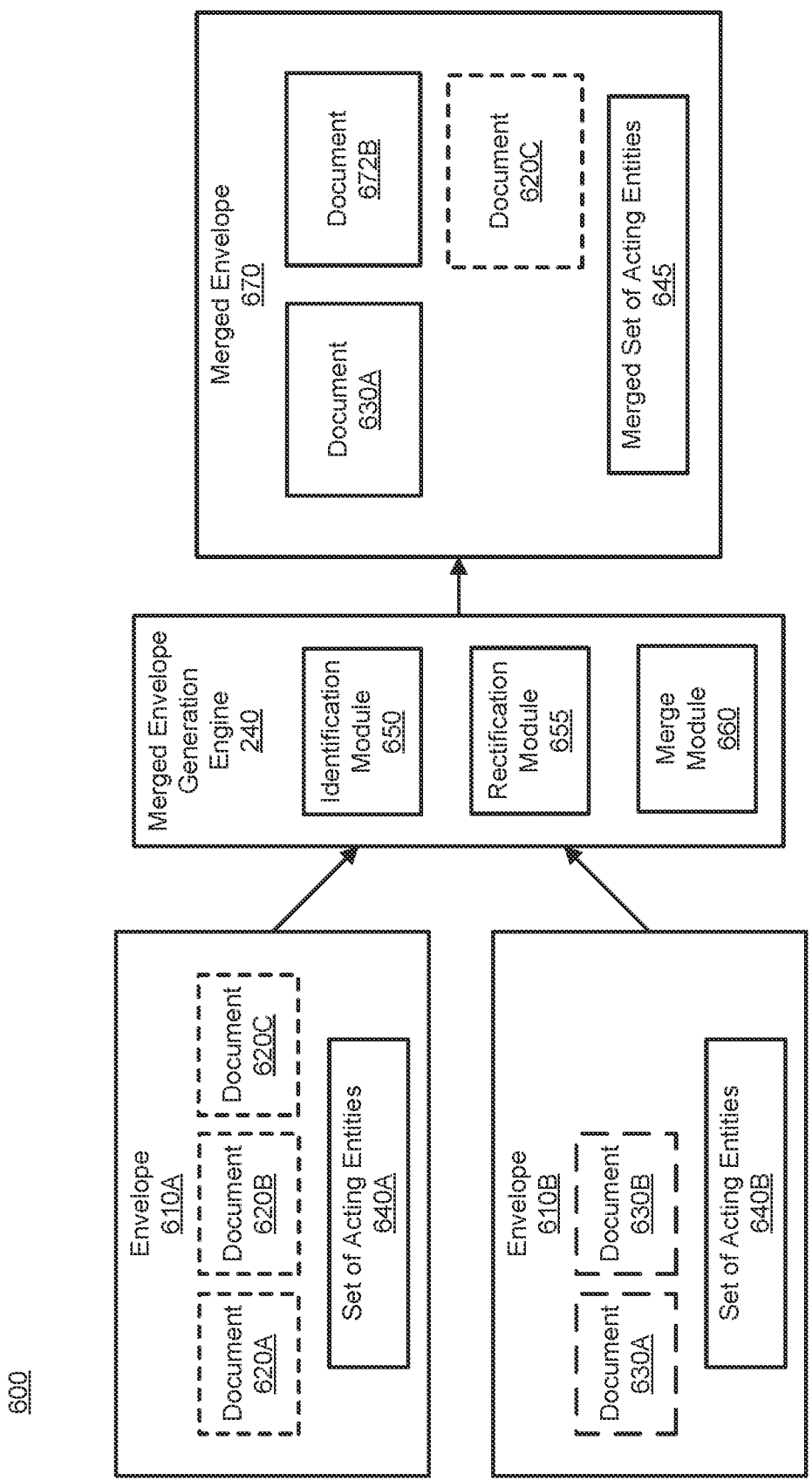
FIG. 6A illustrates a data flow diagram for creating and sending a merged document package from two document packages, according to at least one embodiment.

FIG. 6A illustrates a data flow diagram for creating and sending a merged document package from two document packages, according to at least one embodiment. The process shown in FIG. 6A is performed by the merged envelope generation engine 240 of the centralized document system 110. Embodiments of the data flow diagram 600 may include different and/or additional modules.

An envelope 610A (also referred to as a first document package) is generated to include a first set of documents 620 and a first set of acting entities 640A. The first set of documents 620 include a document 620A, a document 620B, and a document 620C. The envelope 610A may be generated at the request of a first party (e.g., the first party 140 at organization 135A). Each document 620A, 620B, 620C has a document type. For example, the document 620A may be named "Software Purchase Agreement", the document 620B may be a term sheet document category, and the document 620C may be an instruction set document category.

An envelope 610B (also referred to as a second document package) is generated to include a second set of documents 630 and a second set of acting entities 640B. The second set of documents 630 includes a document 630A and a document 630B. The envelope 610B may be generated at the request of a second party (e.g., the second party 150 at organization 135B). Each document 630A and 630B has a document type. For example, the document 630A may be named "Software Purchase Agreement" and the document 630B may be a term sheet document category.

As described above, the merged envelope generation engine 240 merges the envelopes 610A, 610B to generate a merged envelope 670 (also referred to as a merged document package). In some embodiments, the merged envelope generation engine 240 may utilize an identification module 650, a rectification module 655, and a merge module 660 to perform the merge. The identification module 650 scans the first set of documents 620 and the second set of documents 630 and identifies the document types of each document.

The identification module 650 groups documents of a same document type. For example, the identification module 650 groups the document 620A with the document 630A and the document 620B and the document 630B. The identification module 650 scans each document of a particular document type (e.g., scans the document 620A and the document 630A) and compares document content and document tags included in the documents to each other. For example, the document content and the document tags of document 620A are compared to the document content and document tags of document 630A. Also, the document content and the document tags of document 620B are compared to the document content and document tags of document 630B. Compared documents with similar document content and document tags are included in a first subset of documents. Compared documents with conflicts (e.g., with one or more discrepancies) between document content and/or document tags are included in a second subset of documents. Any document(s) (e.g., the document 620C) that is included in one set of documents with no matching document type in the other set of documents is included in a third subset of documents. In an example implementation, the document 620A and the document 630A are placed in the first subset of documents, the document 620B and the document 630B are placed in the second subset of documents, and the document 620C is placed in the third subset of documents.

A rectification module 655 cures any identified conflicts in the second subset of documents. For example, the document 620B and the document 630B are included in the second subset of documents due to a conflict in document content. The rectification module 665 determines which document content to include in a rectified document (e.g., a document 672A). The rectified document 672A replaces the documents 620B, 630B in the second subset of documents.

A merge module 660 generates the merged envelope 670. The merged envelope 670 includes the first subset of documents, the second subset of documents, and the third subset of documents. In some embodiments, the first subset of documents may only include one of the documents 620A, 630A since the documents were determined to be of the same document type and include similar document content and document tags by the identification module 650. The second subset of documents includes the rectified document 672B. The third subset of documents includes the document 620C. The merge module 660 merges the first set of acting entities 640A with the second set of acting entities 640B to create the merged set of acting entities 645.

The merged envelope 670 is provided to the first party and the second party for approval and/or execution. The centralized document system 110 via the interface engine 260 may present the merged envelope 670 to each party differently depending on if the merged envelope generation engine 240 identified a third subset of documents or not. In this example embodiment illustrated in FIG. 6A, the merged envelope generation engine 240 identified a third subset documents. Thus, the first party is provided the merged envelope 670 including the document 630A, the document 672B, and the document 620C and the second party is provided the merged envelope 670 including the document 630A and the document 672B. The merged envelope 670 includes the merged set of acting entities 645.

Figure 6B:
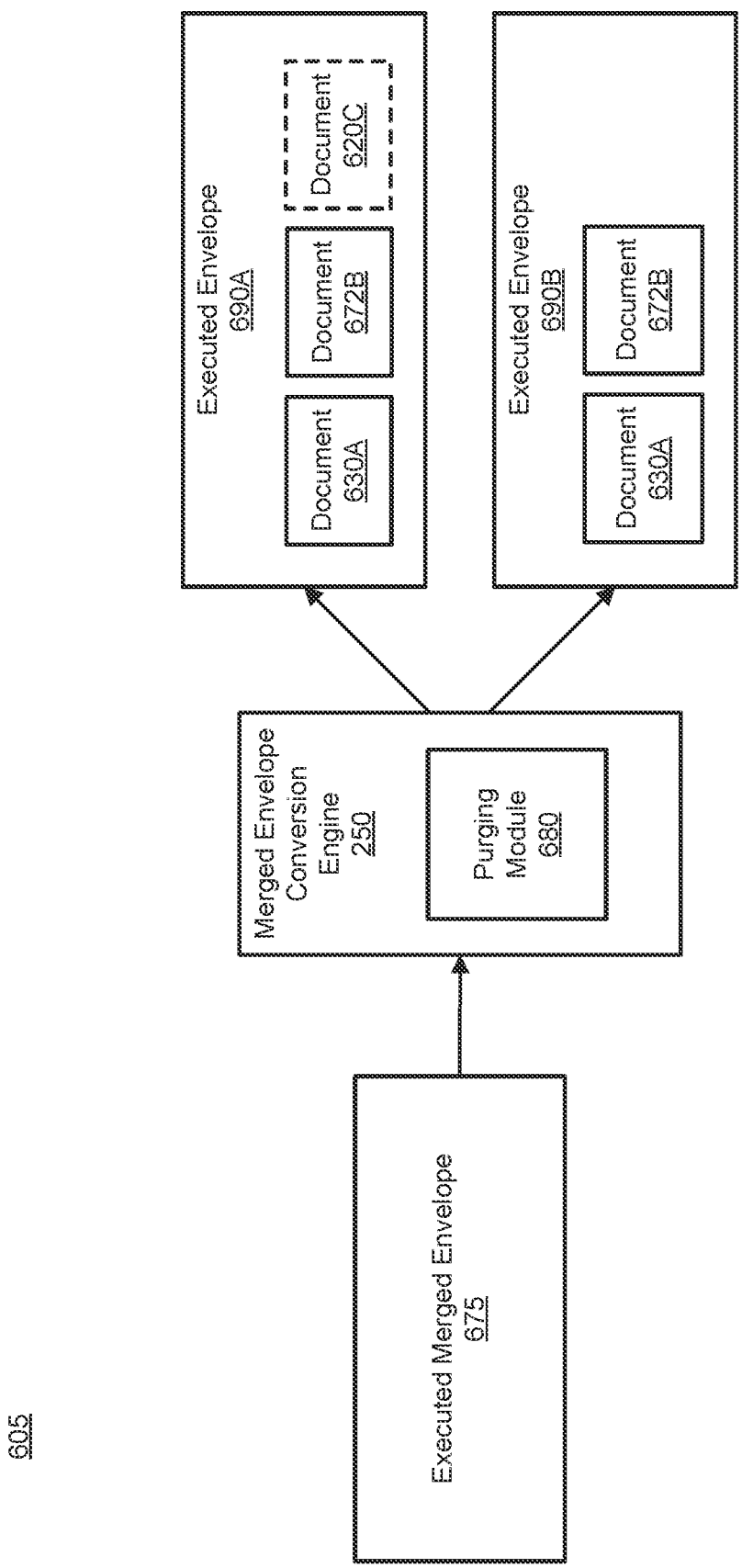
FIG. 6B illustrates a data flow diagram for receiving and converting an executed merged document package into two executed document packages, according to at least one embodiment.

FIG. 6B illustrates a data flow diagram for receiving and converting an executed merged document package into two executed document packages, according to at least one embodiment. The process shown in FIG. 6B is performed by the merged envelope conversion engine 250 of the centralized document system 110. Embodiments of the data flow diagram 605 may include different and/or additional modules.

An executed merged envelope 675 (also referred to as an executed merged document package) is received by the merged envelope conversion engine 250. The executed merged envelope 675 has been executed by both the first party and the second party.

As described above, the merged envelope conversion engine 250 convert the executed merged envelope 675 into an executed envelope 690A (also referred to as an executed first document package) and an executed envelope 690B (also referred to as an executed second document package). In some embodiments, the merged envelope conversion engine 250 utilizes a purging module 680 to perform the conversion. The purging module 680 replaces the first set of documents 620 of the first envelope 610A and the second set of documents 630 of the second envelope 610B with the documents from the executed merged envelope 675. Thus, the first envelope 610A with the documents from the executed merged envelope 675 becomes the executed envelope 690A and the second envelope 610B with the documents from the executed merged envelope 675 becomes the executed envelope 690B.

The executed envelope 690A is provided to the first party. The executed envelope 690A includes the executed document 630A, the executed document 672B, and the document 620C. The executed envelope 690B is provided to the second party. The executed envelope 690B includes the executed document 630A and the executed document 672B.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, by a centralized document system, a request to merge a first document package comprising a first set of documents and a second document package comprising a second set of documents;
identifying, by the centralized document system, a first subset of documents included in both the first set of documents and the second set of documents and identifying, by the centralized document system, a second subset of documents with conflicts between the first set of documents and the second set of documents;
rectifying, by the centralized document system, the second subset of documents to cure the conflicts between the first set of documents and the second set of documents, wherein the rectifying comprises determining which contents from a first target document of the first set of documents and from a second target document of the second set of documents to include in a rectified document of the rectified second subset of documents;
generating, by the centralized document system, a merged document package including the first subset of documents and the rectified second subset of documents; and
in response to the merged document package being executed, converting, by the centralized document system, the executed merged document package into an executed first document package including an executed first set of documents and an executed second document package including an executed second set of documents.

2. The method of claim 1, further comprising:
providing, by the centralized document system, the merged document package to a first party and a second party for approval; and
in response to the merged document package being approved by the first party and the second party, providing, by the centralized document system, the merged document package for execution by the first party and the second party.

3. The method of claim 1, wherein the first document package comprises a first set of acting entities and the second document package comprises a second set of acting entities, and wherein generating the merged document package comprises combining the first set of acting entities and the second set of acting entities to generate a merged set of acting entities.

4. The method of claim 1, wherein at least a portion of contents of the rectified document are either selected for inclusion by one or more users, or are automatically selected based on content selected for inclusion in similar historical rectified documents or by similar historical users.

5. The method of claim 1, wherein the second subset of documents includes a first document from the first set of documents and a second document from the second set of documents, wherein the first document and the second document are of a same document type and one or more tags of the first document differ from one or more tags of the second document, and wherein rectifying the second subset of documents to cure the conflicts comprises combining the one or more tags of the first document with the one or more tags of the second document in a rectified document of the rectified second subset of documents.

6. The method of claim 1, wherein the first set of documents includes a document of a document type for which there is no corresponding document of the document type in the second set of documents, and wherein the method further comprises:
in response to receiving the request to merge, identifying, by the centralized document system, a third subset of documents that includes the document, and
wherein the merged document package further includes the third subset of documents.

7. The method of claim 6, further comprising:
providing, by the centralized document system, the merged document package to a first party and to a second party for execution; and
displaying, by the centralized document system, the merged document package to the first party by displaying the first subset of documents, the rectified second subset of documents, and the third subset of documents and displaying the merged document package to the second party by displaying the first subset of documents and the rectified second subset of documents.

8. Non-transitory computer-readable storage media storing executable instructions that, when executed, cause one or more processors to:
receive a request to merge a first document package comprising a first set of documents and a second document package comprising a second set of documents;
identify a first subset of documents included in both the first set of documents and the second set of documents and identifying a second subset of documents with conflicts between the first set of documents and the second set of documents;
rectify the second subset of documents to cure the conflicts between the first set of documents and the second set of documents, wherein to rectify, the instructions cause the one or more processors to determine which contents from a first target document of the first set of documents and from a second target document of the second set of documents to include in a rectified document of the rectified second subset of documents;
generate a merged document package including the first subset of documents and the rectified second subset of documents; and
in response to the merged document package being executed, convert the executed merged document package into an executed first document package including an executed first set of documents and an executed second document package including an executed second set of documents.

9. The non-transitory computer-readable storage media of claim 8, wherein the instructions further cause the one or more processors to:
provide the merged document package to a first party and a second party for approval; and
in response to the merged document package being approved by the first party and the second party, provide the merged document package for execution by the first party and the second party.

10. The non-transitory computer-readable storage media of claim 8, wherein the first document package comprises a first set of acting entities and the second document package comprises a second set of acting entities, and wherein to generate the merged document package, the instructions cause the one or more processors to combine the first set of acting entities and the second set of acting entities to generate a merged set of acting entities.

11. The non-transitory computer-readable storage media of claim 8, wherein at least a portion of contents of the rectified document are either selected for inclusion by one or more users, or are automatically selected based on content selected for inclusion in similar historical rectified documents or by similar historical users.

12. The non-transitory computer-readable storage media of claim 8, wherein the second subset of documents includes a first document from the first set of documents and a second document from the second set of documents, wherein the first document and the second document are of a same document type and one or more tags of the first document differ from one or more tags of the second document, and wherein to rectify the second subset of documents to cure the conflicts, the instructions cause the one or more processors to combine the one or more tags of the first document with the one or more tags of the second document in a rectified document of the rectified second subset of documents.

13. The non-transitory computer-readable storage media of claim 8, wherein the first set of documents includes a document of a document type for which there is no corresponding document of the document type in the second set of documents, and wherein the instructions cause the one or more processors to:
in response to receiving the request to merge, identify a third subset of documents that includes the document, and
wherein the merged document package further includes the third subset of documents.

14. The non-transitory computer-readable storage media of claim 13, wherein the instructions further cause the one or more processors to:
provide the merged document package to a first party and to a second party for execution; and
display the merged document package to the first party by displaying the first subset of documents, the rectified second subset of documents, and the third subset of documents and displaying the merged document package to the second party by displaying the first subset of documents and the rectified second subset of documents.

15. A centralized document system comprising one or more processors and non-transitory computer-readable storage media storing instructions that, when executed, cause the one or more processors to:

receive a request to merge a first document package comprising a first set of documents and a second document package comprising a second set of documents;

identify a first subset of documents included in both the first set of documents and the second set of documents and identifying a second subset of documents with conflicts between the first set of documents and the second set of documents;

rectify the second subset of documents to cure the conflicts between the first set of documents and the second set of documents, wherein to rectify, the instructions cause the one or more processors to determine which contents from a first target document of the first set of documents and from a second target document of the second set of documents to include in a rectified document of the rectified second subset of documents;

generate a merged document package including the first subset of documents and the rectified second subset of documents; and in response to the merged document package being executed, convert the executed merged document package into an executed first document package including an executed first set of documents and an executed second document package including an executed second set of documents.

16. The centralized document system of claim 15, wherein the instructions further cause the one or more processors to:

provide the merged document package to a first party and a second party for approval; and in response to the merged document package being approved by the first party and the second party, provide the merged document package for execution by the first party and the second party.

17. The centralized document system of claim 15, wherein the first document package comprises a first set of acting entities and the second document package comprises a second set of acting entities, and wherein to generate the merged document package, the instructions cause the one or more processors to combine the first set of acting entities and the second set of acting entities to generate a merged set of acting entities.

18. The centralized document system of claim 15, wherein at least a portion of contents of the rectified document are either selected for inclusion by one or more users, or are automatically selected based on content selected for inclusion in similar historical rectified documents or by similar historical users.

19. The centralized document system of claim 15, wherein the second subset of documents includes a first document from the first set of documents and a second document from the second set of documents, wherein the first document and the second document are of a same document type and one or more tags of the first document differ from one or more tags of the second document, and wherein to rectify the second subset of documents to cure the conflicts, the instructions cause the one or more processors to combine the one or more tags of the first document with the one or more tags of the second document in a rectified document of the rectified second subset of documents.

20. The centralized document system of claim 15, wherein the first set of documents includes a document of a document type for which there is no corresponding document of the document type in the second set of documents, and wherein the instructions further cause the one or more processors to:

in response to receiving the request to merge, identify a third subset of documents that includes the document, and wherein the merged document package further includes the third subset of documents.

* * * * *